US012315973B2

(12) United States Patent
Lai

(10) Patent No.: US 12,315,973 B2
(45) Date of Patent: May 27, 2025

(54) SYSTEM FOR FUEL CELL MEMBRANE EDGE PROTECTION VIA A GAS DIFFUSION LAYER INCLUDING PATTERNED WETTABILITY

(71) Applicant: GM GLOBAL TECHNOLOGY OPERATIONS LLC, Detroit, MI (US)

(72) Inventor: Yeh-Hung Lai, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 432 days.

(21) Appl. No.: 17/946,255

(22) Filed: Sep. 16, 2022

(65) Prior Publication Data
US 2024/0097171 A1  Mar. 21, 2024

(51) Int. Cl.
*H01M 8/1004* (2016.01)
*H01M 8/0241* (2016.01)
*H01M 8/10* (2016.01)

(52) U.S. Cl.
CPC ....... *H01M 8/1004* (2013.01); *H01M 8/0241* (2013.01); *H01M 2008/1095* (2013.01)

(58) Field of Classification Search
CPC ............. H01M 8/1004; H01M 8/0241; H01M 2008/1095; H01M 8/0234; H01M 8/0273; Y02E 60/50
See application file for complete search history.

(56) References Cited

U.S. PATENT DOCUMENTS 6,020,083 A * 2/2000 Breault ................. H01M 8/028
429/510
2014/0072899 A1* 3/2014 Fly ...................... H01M 8/0284
429/479

OTHER PUBLICATIONS

Forner-Cuenca et al., Advanced Water Management in PEFCs: Diffusion Layers with Patterned Wettability, May 2016, J. Electrochem. Soc., 163(8), F788-F801 (Year: 2016).*
Antoni Forner-Cuenca, et al., "Advanced Water Management in PEFCs: Diffusion Layers with Patterned Wettability", Journal of The Electrochemical Society, 163 (8) F788-F801 (2016).

* cited by examiner

*Primary Examiner* — Daniel S Gatewood
(74) *Attorney, Agent, or Firm* — Quinn IP Law

(57) ABSTRACT

A system for fuel cell membrane edge protection includes a fuel cell including a fuel-cell membrane-subgasket assembly. The assembly includes an anode gas diffusion electrode and a cathode gas diffusion electrode configured for facilitating an electrochemical reaction. The reaction creates water as a by-product. The assembly further includes a proton exchange membrane disposed between the electrodes and a subgasket. The subgasket includes an interior aperture portion defined by a perimeter and is connected to the anode gas diffusion electrode and the membrane about the perimeter such that an area of overlap between the subgasket, the electrode, and the membrane exists around the perimeter. The assembly further includes a carbon paper layer spanning the interior aperture portion. The layer includes patterned wettability and is configured to move the water away from the area of overlap into a center portion of the layer.

20 Claims, 7 Drawing Sheets

SYSTEM FOR FUEL CELL MEMBRANE EDGE PROTECTION VIA A GAS DIFFUSION LAYER INCLUDING PATTERNED WETTABILITY

INTRODUCTION

The disclosure generally relates to a system for fuel cell membrane edge protection via a gas diffusion layer including patterned wettability.

A fuel cell utilizes a flow of hydrogen gas or another fuel and a flow of oxygen to create electrical energy. A fuel cell includes at least one pair of anode electrode and cathode electrode separated by a proton exchange membrane (PEM). As hydrogen or another fuel is exposed to the anode and as oxygen in the form of compressed air is exposed to the cathode, a chemical reaction takes place. The PEM facilitates ion exchange between the anode and cathode useful for the chemical reaction.

As the chemical reaction of the fuel cell takes place, water may be produced as a by-product of the reaction. Water produced in the chemical reaction may be managed to avoid the water flooding the components of the fuel cell and reducing efficiency of the fuel cell.

SUMMARY

A system for fuel cell membrane edge protection is provided. The system includes a fuel cell including a fuel-cell membrane-subgasket assembly. The assembly includes an anode gas diffusion electrode and a cathode gas diffusion electrode configured for facilitating an electrochemical reaction with the anode gas diffusion electrode, wherein the electrochemical reaction creates water as a by-product. The assembly further includes a proton exchange membrane disposed between the anode gas diffusion electrode and the cathode gas diffusion electrode. The assembly further includes a subgasket including an interior aperture portion defined by a perimeter. The subgasket is connected to the anode gas diffusion electrode and the proton exchange membrane about the perimeter such that an area of overlap between the subgasket, the anode gas diffusion electrode, and the proton exchange membrane exists around the perimeter. The assembly further includes a carbon paper layer spanning the interior aperture portion of the subgasket. The carbon paper layer includes patterned wettability and is configured to move the water away from the area of overlap into a center portion of the carbon paper layer.

In some embodiments, the cathode gas diffusion electrode has a first planar side and a second planar side. The proton exchange membrane is attached to the first planar side and the carbon paper layer is attached to the second planar side.

In some embodiments, the anode gas diffusion electrode has a first planar side. The carbon paper layer is attached to the first planar side.

In some embodiments, the anode gas diffusion electrode has a first planar side and a second planar side. The proton exchange membrane is attached to the first planar side and the carbon paper layer is attached to the second planar side.

In some embodiments, the carbon paper layer includes a pattern of hydrophilic portions and hydrophobic portions configured for providing the patterned wettability.

In some embodiments, the carbon paper layer has an outer perimeter. The pattern of hydrophilic portions and hydrophobic portions include a frame portion around the outer perimeter including a first portion of the hydrophilic portions and a repeating pattern of alternating parallel lines interior to the frame portion. The alternating parallel lines including a second portion of the hydrophilic portions and the hydrophobic portions.

In some embodiments, the alternating parallel lines are vertically oriented to span between horizontal portions of the frame portion.

In some embodiments, the frame portion is configured for transporting the water to the second portion of the hydrophilic portions interior to the frame portion.

In some embodiments, the hydrophilic portions include N-vinylformamide or acrylic acid.

In some embodiments, the hydrophobic portions include polytetrafluoroethylene (PTFE) or fluorinated ethylene propylene (FEP).

In some embodiments, the hydrophobic portions are configured for resisting a flow of the water into the hydrophobic portions and providing for evaporation of the water from the hydrophilic portions.

In some embodiments, the fuel-cell membrane-subgasket assembly further includes a first header configured for channeling hydrogen into the fuel-cell membrane-subgasket assembly and a second header configured for transporting an excess of hydrogen out of the fuel-cell membrane-subgasket assembly. The assembly further includes a third header configured for transmitting an oxidant into the fuel-cell membrane-subgasket assembly and a fourth header configured for transporting an excess of the oxidant out of the fuel-cell membrane-subgasket assembly. The assembly further includes a fifth header configured for bringing a coolant into the fuel-cell membrane-subgasket assembly and a sixth header configured for transporting the coolant out of the fuel-cell membrane-subgasket assembly. The water upon the center portion is transported out of the fuel-cell membrane-subgasket assembly through the second header or the fourth header.

According to one alternative embodiment, a system for fuel cell membrane edge protection in a device is provided. The system includes the device including a fuel cell. The fuel cell includes a fuel-cell membrane-subgasket assembly. The assembly includes an anode gas diffusion electrode and a cathode gas diffusion electrode configured for facilitating an electrochemical reaction with the anode gas diffusion electrode. The electrochemical reaction creates water as a by-product. The assembly further includes a proton exchange membrane disposed between the anode gas diffusion electrode and the cathode gas diffusion electrode. The assembly further includes a subgasket including an interior aperture portion defined by a perimeter. The subgasket is connected to the anode gas diffusion electrode and the proton exchange membrane about the perimeter such that an area of overlap between the subgasket, the anode gas diffusion electrode, and the proton exchange membrane exists around the perimeter. The assembly further includes a carbon paper layer spanning the interior aperture portion of the subgasket, wherein the carbon paper layer includes patterned wettability and is configured to move the water away from the area of overlap into a center portion of the carbon paper layer.

In some embodiments, the carbon paper layer includes a pattern of hydrophilic portions and hydrophobic portions configured for providing the patterned wettability.

In some embodiments, the carbon paper layer has an outer perimeter. The pattern of hydrophilic portions and hydrophobic portions include a frame portion around the outer perimeter including a first portion of the hydrophilic portions and a repeating pattern of alternating parallel lines interior to the frame portion. The alternating parallel lines including a second portion of the hydrophilic portions and the hydrophobic portions.

In some embodiments, the frame portion is configured for transporting the water to the second portion of the hydrophilic portions interior to the frame portion.

In some embodiments, the hydrophilic portions include N-vinylformamide or acrylic acid.

In some embodiments, the hydrophobic portions include polytetrafluoroethylene (PTFE) or fluorinated ethylene propylene (FEP).

The above features and advantages and other features and advantages of the present disclosure are readily apparent from the following detailed description of the best modes for carrying out the disclosure when taken in connection with the accompanying drawings.

DETAILED DESCRIPTION

Figure 1:
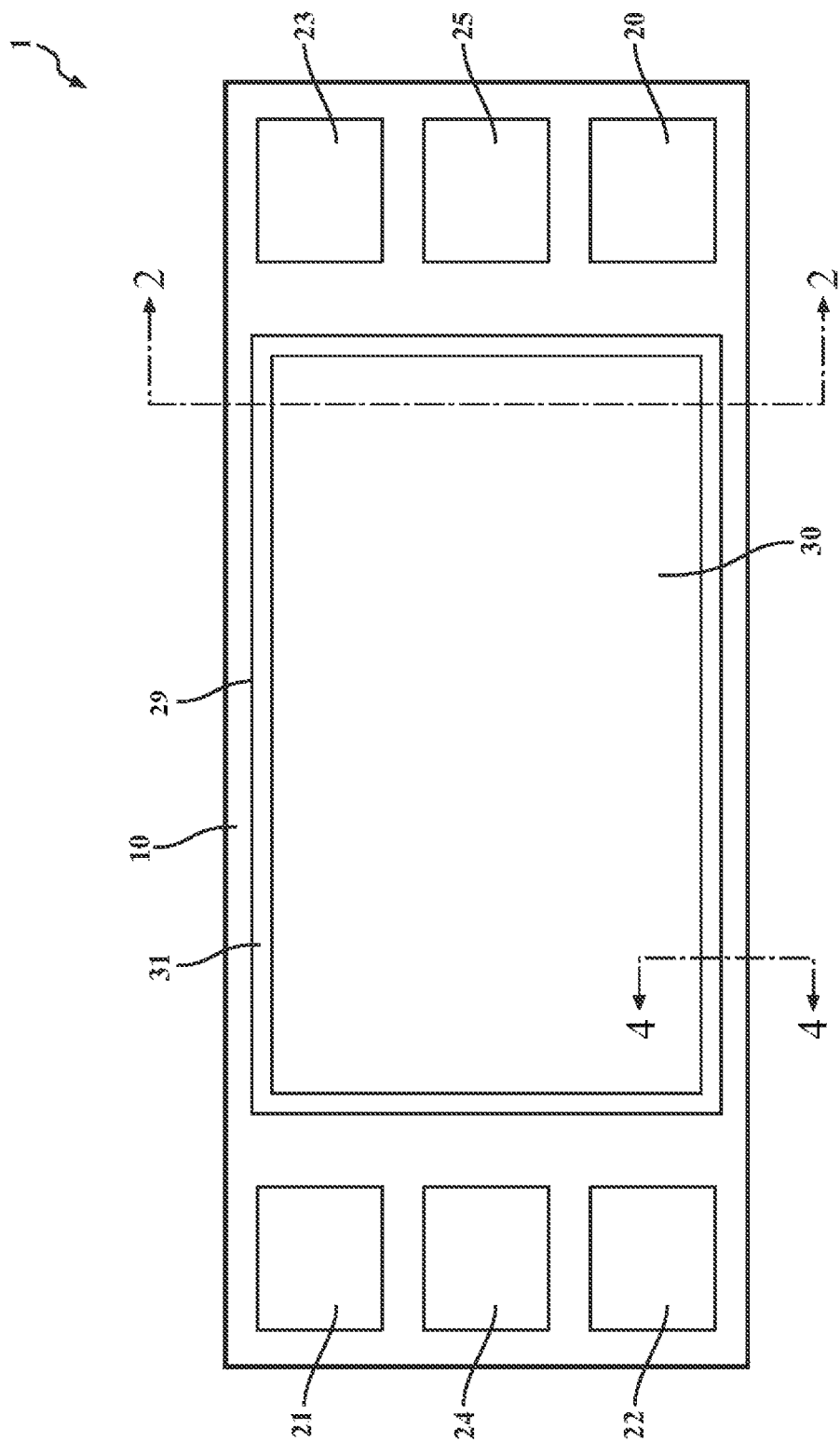
FIG. 1 schematically illustrates an embodiment of a fuel-cell membrane-subgasket assembly, in accordance with the present disclosure.

Membrane chemical degradation in a fuel cell may occur near a gas diffusion electrode (GDE)/proton exchange membrane (PEM)/subgasket (SG) overlap region due to iron contamination. For example, evidence suggests that the exposed membrane at the GDE/PEM edge may be a likely pathway for iron transport into the membrane, thus leading to accelerated membrane chemical degradation. Liquid water produced as a by-product to the chemical reaction of the fuel cell tends to accumulate at the GDE/PEM/SG overlap edge.

A fuel cell may include a first end plate, a first fuel-cell membrane-subgasket assembly, a bi-polar plate, a second fuel-cell membrane-subgasket assembly, and a second end plate. The bi-polar plate may be constructed with metal or graphite. The end plates and the bi-pilar plate may include flow channels to direct a fuel, an oxidant, and a coolant to and/or through the fuel cell to facilitate the electrochemical reaction of the fuel cell and to cool the fuel cell, respectively.

Headers upon a subgasket of the fuel-cell membrane-subgasket assembly aid in channeling the fuel, the oxidant, and the coolant through the fuel cell. A plurality of bi-pilar plates may be utilized to separate and enable use of more than two fuel-cell membrane-subgasket assemblies in the fuel cell. The two end plates are used to cover and abut the two outer-most fuel-cell membrane-subgasket assemblies in the fuel cell.

A system and method to remove the accumulated liquid water through carbon paper with patterned wettability is described herein. The carbon paper may transfer the liquid water away from the original accumulation sites in two steps. First, the carbon paper spreads the water from edge locations initially including a high quantity of liquid water to other edge areas along the edge stripes of the grafted carbon paper. Second, the carbon paper transfers the water from the GDE/PEM/SG overlap region into an interior of the active area, where water may be absorbed by membrane or transferred through headers out of the stack. The carbon paper may be configured as a gas diffusion layer (GDL) for a GDE.

Current designs may rely on the gas flow over an edge portion of the electrodes and PEM to purge liquid water down the active area bypass passage. However, this method may not be effective in purging liquid water that clings to the edge portion of the electrodes and PEM because of the hydrophilic nature at this intersection. The disclosed system purges the liquid water down the bypass passage. A carbon paper GDL with patterned wettability or a pattern including hydrophilic portions and hydrophobic portions may be utilized to wick the liquid water away from the edge portion of the electrodes and PEM into the interior of the active area. The carbon paper GDL with patterned wettability may be used upon an anode electrode of a fuel cell, a cathode electrode of the fuel cell, or both the anode electrode and the cathode electrode of the fuel cell. As a result of the wicking enabled by the patterned wettability, the present disclosure enables simultaneously reduction in the probability of iron corrosion in a stagnated water environment at the active area edge and removal of a pathway for iron ion to enter the membrane through liquid water.

The present disclosure provides a design to remove the accumulated liquid water through the carbon paper with patterned wettability to transfer the liquid water away from the original accumulation sites in two steps: (1) Spread the water from edge locations of high quantity of liquid water to other edge area along the edge stripes of grafted paper; and (2) Transfer the water from GDE/PEM/SG overlap region into the interior of the active area, where water may be absorbed by membrane or transferred through headers out of the stack. Using the GDL of patterned wettability, the hydrophilic phase of the patterned GDL may wick liquid water from wet (high water content) region to dryer region. In the dryer region, the liquid water may evaporate, which subsequently may be transported out of the fuel cell.

A sequence of events that may lead to enhanced membrane chemical durability according to the present disclosure include: first, stagnated liquid water is removed from the GDE/PEM edge by the present disclosure; second, the end plate and bipolar plates are kept dry at the GDE/PEM/SG edge, reducing the chance of plate corrosion and the release of iron ions; third, simultaneously, the liquid-water pathway for iron ion to transport into membrane from the GDE/PEM edge is cut off; and fourth, membrane durability is enhanced without iron ions entering from the exposed edge.

The pattern on the carbon paper with patterned wettability may include edge stripes over the overlap region along the edge of active area and stripes that are connected and extended from the edge stripes into the interior of the active area.

A system for fuel cell membrane edge protection is provided. The system includes a fuel cell including a fuel-cell membrane-subgasket assembly. The assembly includes an anode gas diffusion electrode and a cathode gas diffusion electrode configured for facilitating an electrochemical reaction with the anode gas diffusion electrode. The reaction creates water as a by-product. The assembly further includes a proton exchange membrane disposed between the anode gas diffusion electrode and the cathode gas diffusion electrode and a subgasket. The subgasket includes an interior aperture portion defined by a perimeter and is connected to the anode gas diffusion electrode and the membrane about the perimeter such that an area of overlap between the subgasket, the electrode, and the membrane exists around the perimeter. The assembly further includes a carbon paper layer spanning the interior aperture portion of the subgasket. The layer includes patterned wettability and is configured to move the water away from the area of overlap into a center portion of the carbon paper layer.

The cathode gas diffusion electrode may include a first planar side and a second planar side. The proton exchange membrane may be attached to the first planar side and the carbon paper layer may be attached to the second planar side.

The anode gas diffusion electrode may have a first planar side. The carbon paper layer may be attached to the first planar side.

The anode gas diffusion electrode may have a first planar side and a second planar side. The proton exchange membrane may be attached to the first planar side and the carbon paper layer is attached to the second planar side.

The carbon paper layer may include a pattern of hydrophilic portions and hydrophobic portions configured for providing the patterned wettability.

The carbon paper layer may have an outer perimeter. The pattern of hydrophilic portions and hydrophobic portions may include a frame portion around the outer perimeter including a first portion of the hydrophilic portions and a repeating pattern of alternating parallel lines interior to the frame portion. The alternating parallel lines may include a second portion of the hydrophilic portions and the hydrophobic portions.

The alternating parallel lines may be vertically oriented to span between horizontal portions of the frame portion.

The frame portion may be configured for transporting the water to the second portion of the hydrophilic portions interior to the frame portion.

The hydrophilic portions may include N-vinylformamide or acrylic acid.

The hydrophobic portions may include polytetrafluoroethylene (PTFE) or fluorinated ethylene propylene (FEP).

In some embodiments, the hydrophobic portions may be configured for resisting a flow of the water into the hydrophobic portions and providing for evaporation of the water from the hydrophilic portions.

In some embodiments, the fuel-cell membrane-subgasket assembly may further include a first header configured for channeling hydrogen into the fuel-cell membrane-subgasket assembly and a second header configured for transporting an excess of hydrogen out of the fuel-cell membrane-subgasket assembly. The assembly may further include a third header configured for transmitting an oxidant into the fuel-cell membrane-subgasket assembly and a fourth header configured for transporting an excess of the oxidant out of the fuel-cell membrane-subgasket assembly. The assembly may further include a fifth header configured for bringing a coolant into the fuel-cell membrane-subgasket assembly and a sixth header configured for transporting the coolant out of the fuel-cell membrane-subgasket assembly. The water upon the center portion may be transported out of the fuel-cell membrane-subgasket assembly through the second header or the fourth header.

Figure 2:
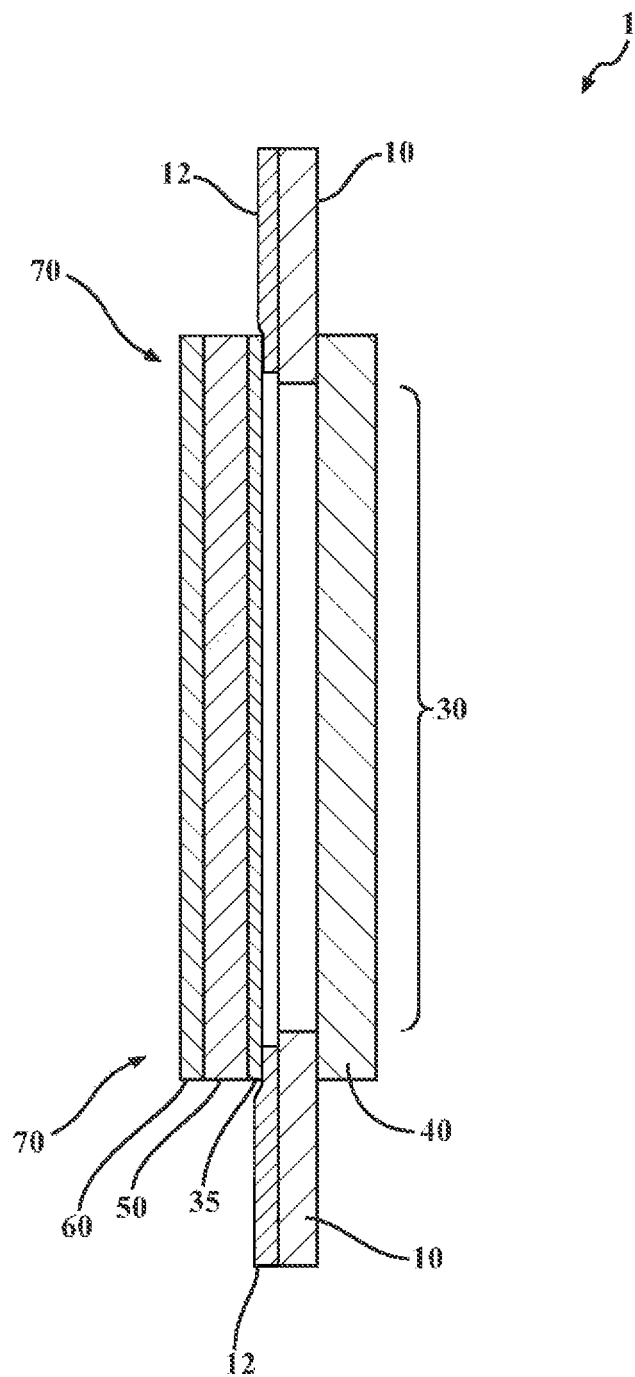
FIG. 2 schematically illustrates a cross-sectional view of the fuel-cell membrane-subgasket assembly of FIG. 1, in accordance with the present disclosure.

Referring now to the drawings, wherein like reference numbers refer to like features throughout the several views, FIG. 1 schematically illustrates an embodiment of a fuel-cell membrane-subgasket assembly 1. A cross-section 2 of the fuel-cell membrane-subgasket assembly 1 is defined. A cross-section 4 of a perimeter 31 of the fuel-cell membrane-subgasket assembly 1 is defined. FIG. 2 schematically illustrates the fuel-cell membrane-subgasket assembly 1 of FIG. 1 in cross sectional view, illustrating cross-section 2.

Referring to FIGS. 1 and 2, a fuel-cell membrane-subgasket assembly 1 according to some embodiments may comprise a PEM 35 and a subgasket 10 overlying the PEM 35 around a perimeter 31 of the PEM 35. As used herein, the term "overlying" with respect to the subgasket 10 refers to the location of the subgasket 10 relative to the PEM 35 and does not preclude the presence of additional features between the subgasket 10 and the PEM 35. Moreover, it may be understood that the term "overlying" is not intended to imply a preferred orientation of the fuel-cell membrane-subgasket assembly 1, such that in operation the subgasket could be above the PEM 35 in some embodiments, below the PEM 35 in other embodiments, or beside the PEM 35 in still other embodiments. The subgasket 10 may define an active area 30 inside the perimeter 31. The active area 30 exists within an interior aperture portion 29 of the subgasket 10 defined by the perimeter 31. An area of overlap 70 may be described around the perimeter 31 describing an overlap of the subgasket 10 with the PEM 35, an anode gas diffusion electrode 40, a cathode gas diffusion electrode 50, and a carbon paper layer 60. The subgasket 10 may include an adhesive 12. The adhesive 12 may include overlap with and may be adhered to the PEM 35. The carbon paper layer 60 may be described as a GDL. The fuel-cell membrane-subgasket assembly 1 may include the carbon paper layer 60 attached to the cathode gas diffusion electrode 50, the anode gas diffusion electrode 40, or layers of carbon paper 60 attached to both of the cathode gas diffusion electrode 50 and the anode gas diffusion electrode 40.

The fuel-cell membrane-subgasket assembly 1 may further include the anode gas diffusion electrode 40, the cathode gas diffusion electrode 50, and the carbon paper layer 60. The subgasket 10 is interposed between the anode gas diffusion electrode 40 and the PEM 35.

Water accumulating around perimeter 31 may be problematic. The carbon paper layer 60 is configured for channeling water away from the perimeter 31. In one embodiment, the carbon paper layer 60 may be configured for patterned wettability, with a pattern of at least one hydrophilic portion of the carbon paper layer 60 and of at least one hydrophobic portion of the carbon paper layer 60 being useful to distribute water across the carbon paper layer 60.

The subgasket 10 may have defined therein a plurality of individual channels or headers for accommodating the flow of gases or fluids such as, for example, fuel, oxidant, or coolant. For example, the subgasket 10 may have defined therein a first subgasket header 20, a second subgasket header 21, a third subgasket header 22, a fourth subgasket header 23, a fifth subgasket header 24, and a sixth subgasket header 25. The headers 20, 21, 22, 23, 24, 25 may be described as flow channels. In a fuel-cell assembly or fuel-cell stack including a fuel-cell membrane-subgasket assembly 1, for example, each of the individual channels or headers may be in fluidic communication with corresponding channels or headers on other plates of the fuel-cell assembly or fuel-cell stack.

The subgasket 10 may be formed from a suitable subgasket material in the art. In non-limiting embodiments, the subgasket 10 may be formed from polymeric materials such as polyolefins (e.g., polyethylene, polypropylene, mixtures thereof, and derivatives thereof), polyethylene naphthalate (PEN), or Mylar, for example. In preferred embodiments, the subgasket 10 may be made from poly(ethylene terephthalate) (PET). In illustrative embodiments, the subgasket 10 may have a thickness of from about 12 micrometers to about 125 micrometers or, preferably, from about 25 micrometers to about 75 micrometers. The subgasket 10 may be approximately 50 micrometers thick.

During operation of a fuel cell including the fuel-cell membrane-subgasket assembly 1, a fuel such as hydrogen, for example, may flow through the header 20 in one direction perpendicular to the plane of the subgasket 10 and through the header 21 in the opposite direction. An oxidant such as oxygen, for example, may flow through the header 22 in one direction perpendicular to the plane of the subgasket 10 and through the header 23 in the opposite direction. Likewise, a coolant such as water, for example, may flow through the header 24 in one direction perpendicular to the plane of the subgasket 10 and through the header 25 in the opposite direction. Depending on the operational circumstances of such a fuel cell, it may be understood that the flow directions of the fuel, the oxidant, and the coolant on one side of the subgasket 10 (e.g., through the header 21, the header 22, and the header 24), may be the same, or that two of the fuel, the oxidant, and the coolant may have a counterflow relationship to the remaining one of the fuel, the oxidant, and the coolant on the same sides of the subgasket 10.

Figure 7:
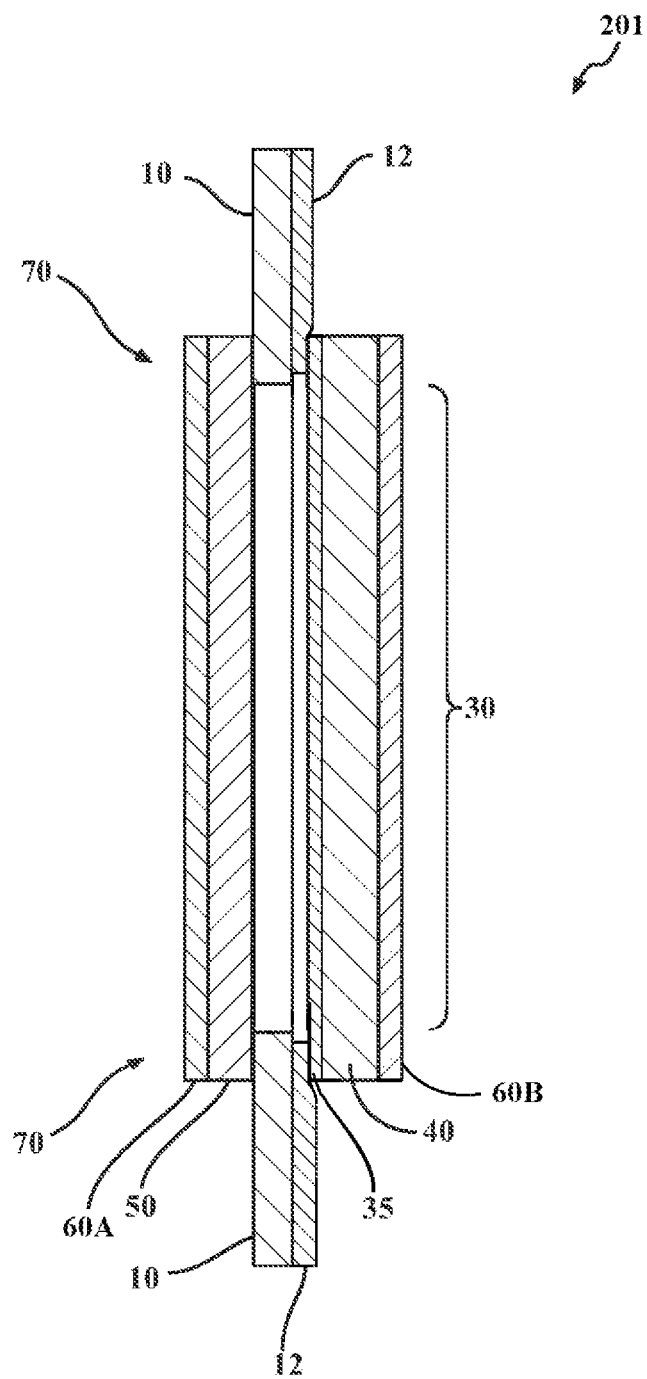
FIG. 7 schematically illustrates a fuel-cell membrane-subgasket assembly provided as an alternative embodiment to the fuel-cell membrane-subgasket assembly of FIG. 2, in accordance with the present disclosure.

FIG. 2 illustrate s one exemplary arrangement of components to the fuel-cell membrane-subgasket assembly 1. Other arrangements are envisioned. FIG. 7 schematically illustrates a fuel-cell membrane-subgasket assembly 201 provided as an alternative embodiment to the fuel-cell membrane-subgasket assembly 1 of FIG. 2. The fuel-cell membrane-subgasket assembly 201 operates substantially similarly to the fuel-cell membrane-subgasket assembly 1. The fuel-cell membrane-subgasket assembly 201 includes the subgasket 10 including the adhesive 12. The fuel-cell membrane-subgasket assembly 201 further includes the PEM 35 attached to the anode gas diffusion electrode 40. The fuel-cell membrane-subgasket assembly 201 further includes the cathode gas diffusion electrode 50. A first layer of carbon paper layer 60A is attached to the cathode gas diffusion electrode 50. A second layer of carbon paper 60B is attached to the anode gas diffusion electrode 40. The subgasket 10 defines the active area 30. The area of overlap 70 is indicated in two areas.

Figure 3:
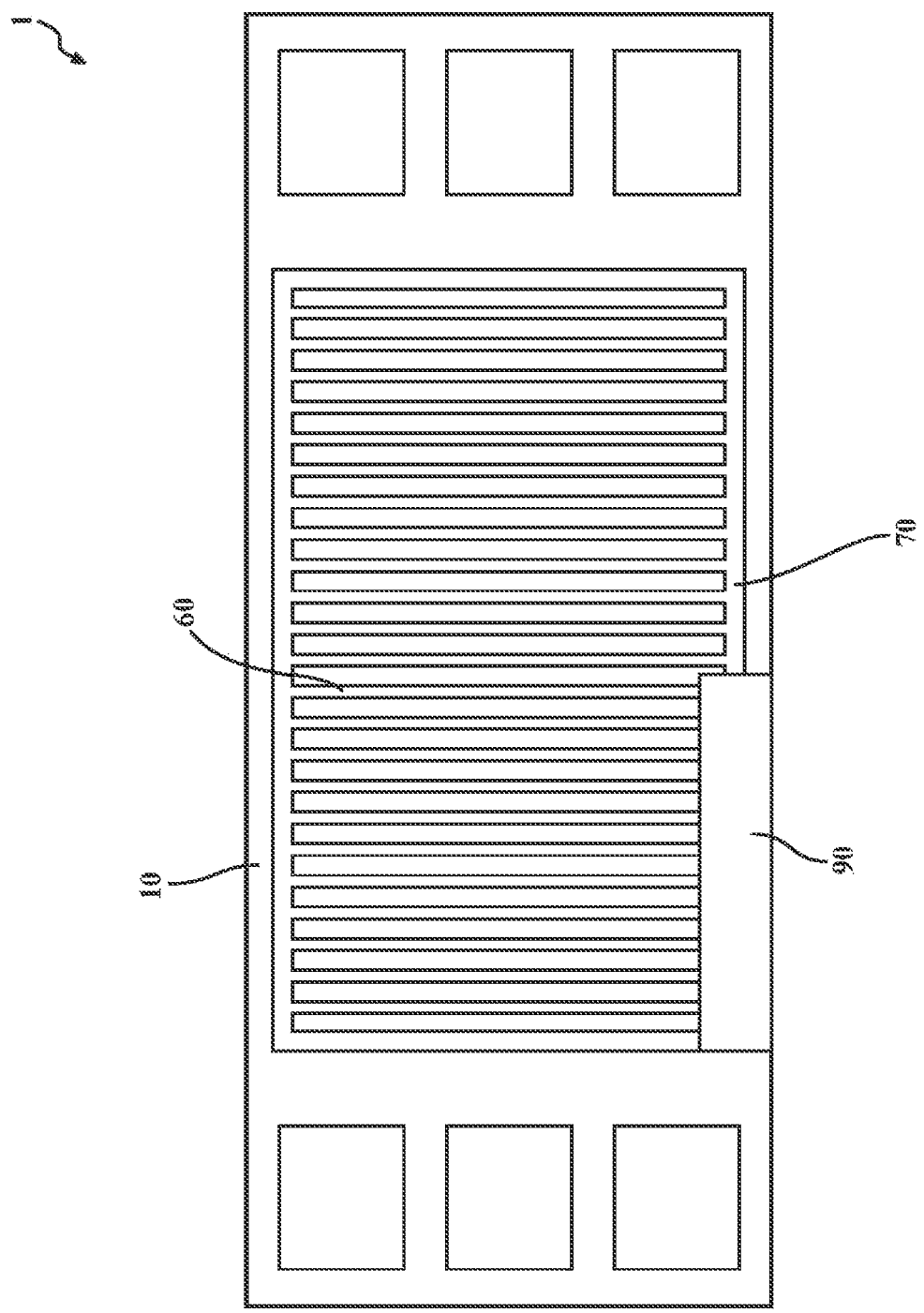
FIG. 3 schematically illustrates the fuel-cell membrane-subgasket assembly of FIG. 1 wherein a pocket of water has collected around a portion of the perimeter, in accordance with the present disclosure.

FIG. 3 schematically illustrates the fuel-cell membrane-subgasket assembly 1 of FIG. 1 wherein a pocket of water 90 has collected around a portion of the area of overlap 70 around the perimeter 31 of FIG. 1. The fuel-cell membrane-subgasket assembly 1 is illustrated including the subgasket 10 and the carbon paper layer 60. The pocket of water 90 is in contact with the carbon paper layer 60.

Figure 4:
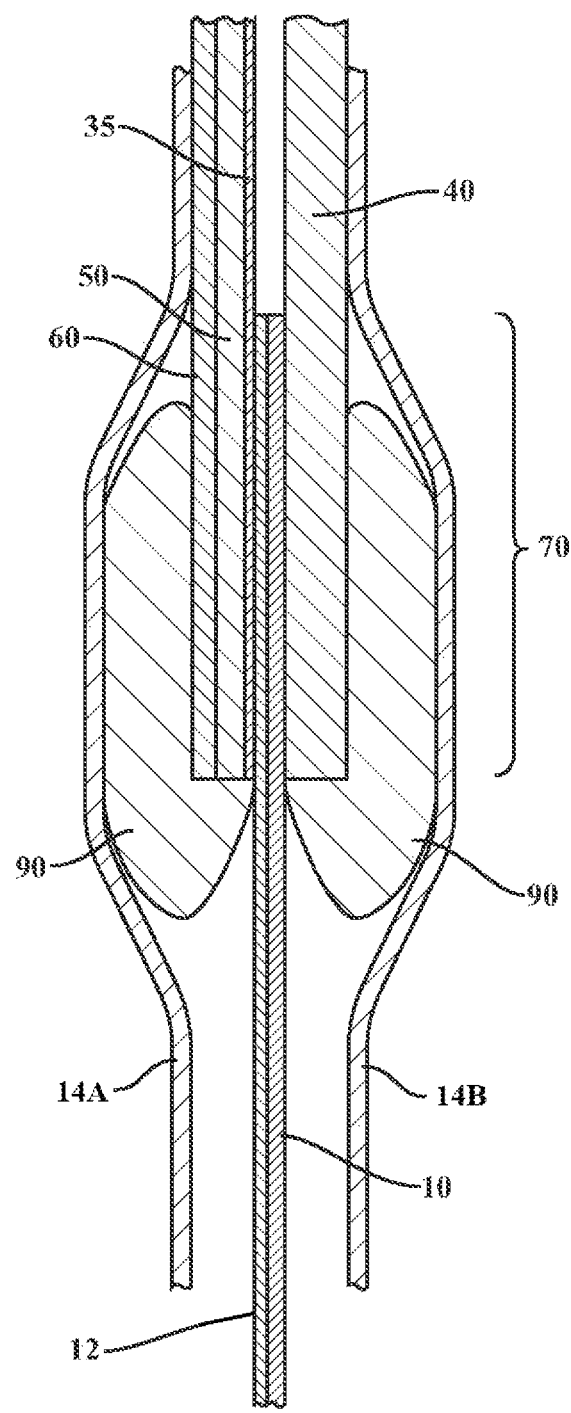
FIG. 4 schematically illustrates a cross-sectional view of a portion of the fuel-cell membrane-subgasket assembly of FIG. 1 and additionally including the pocket of water of FIG. 3, in accordance with the present disclosure.

FIG. 4 schematically illustrates the fuel-cell membrane-subgasket assembly 1 of FIG. 1 including the cross-section 4 and additionally including the pocket of water 90 of FIG. 3. The area of overlap 70 of the perimeter 31 of FIG. 1 is illustrated, wherein the subgasket 10 overlaps with the PEM 35, the anode gas diffusion electrode 40, the cathode gas diffusion electrode 50, and the carbon paper layer 60. Adhesive 12 is illustrated attached to the subgasket 10. A layer of an end plate 14A and a layer of a bi-polar plate 14B are illustrated. The pocket of water 90 is illustrated in contact with a portion of the carbon paper layer 60.

Figure 5:
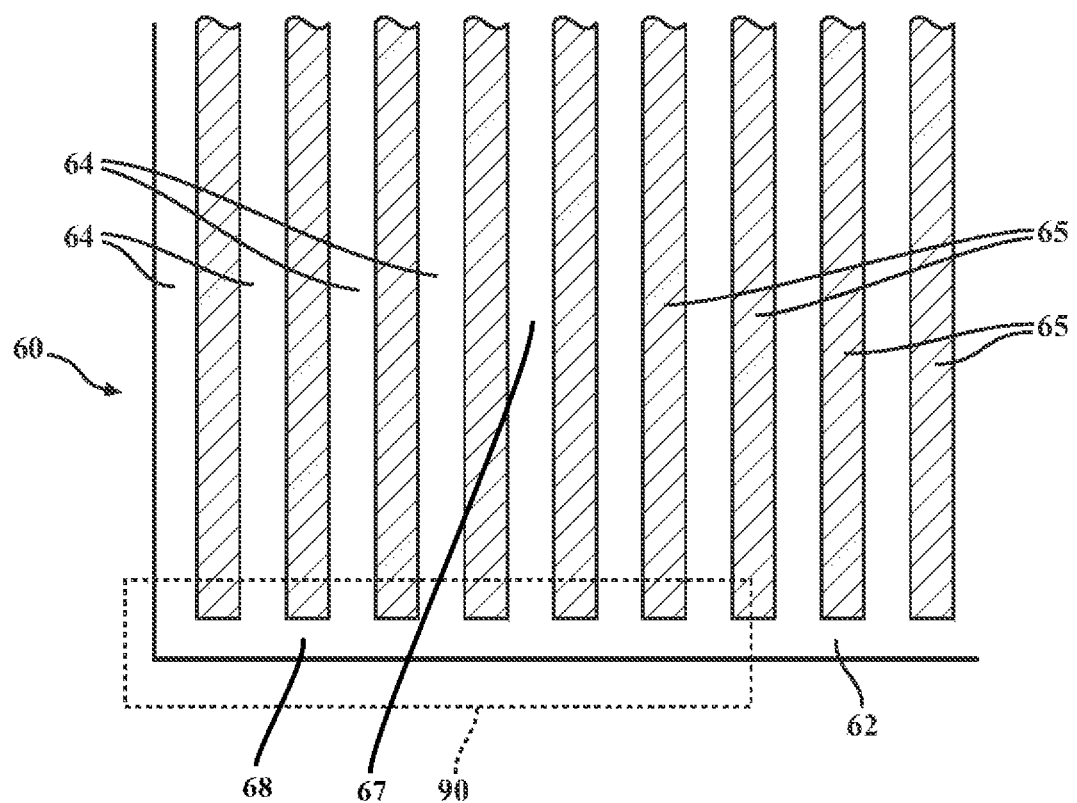
FIG. 5 illustrates the carbon paper layer of FIG. 3 in magnified scale, wherein the carbon paper layer is configured for patterned wettability, in accordance with the present disclosure.

FIG. 5 illustrates the carbon paper layer 60 of FIG. 3 in magnified scale, wherein the carbon paper layer 60 is configured for patterned wettability. The carbon paper layer 60 is illustrated including a pattern of hydrophilic portions 62, 64 and of hydrophobic portions 65. The hydrophilic portions 62, 64 may be treated or grafted with materials configured for encouraging water to soak into and travel along the hydrophilic portions 62, 64. In a non-limiting example, the hydrophilic portions 62, 64 may be treated with N-vinylformamide or acrylic acid in order to provide the hydrophilic portions 62, 64 with hydrophilic properties. The hydrophobic portions 65 may be treated or grafted with materials configured for preventing water from entering or soaking into the hydrophobic portions 65. In a non-limiting example, the hydrophobic portions 65 may be treated or grafted with polytetrafluoroethylene (PTFE) or with fluorinated ethylene propylene (FEP). The alternating patterns of hydrophilic portions 64 and hydrophobic portions 65 facilitates water movement along the hydrophilic portions 62, 64 with capillary action in the hydrophilic portions 62 permitting water to fill pores along a length of the hydrophilic portions 62, 64. Further, the alternating patterns of hydrophilic portions [62] 64 and hydrophobic portions 65 facilitates evaporation of the water in the hydrophilic portions 62, 64, with gas in the hydrophobic portions 65 being next to and in contact with carbon fibers of the neighboring hydrophilic portions 64. The hydrophobic portions 65 increase a surface area to which gas is exposed to the hydrophilic portions 62, 64, thereby speeding evaporation of water 90 in the hydrophilic portions 62, 64. The exemplary embodiment of FIG. 3 illustrates one configuration enabling patterned wettability of the carbon paper layer 60. Other configurations with other patterns of hydrophilic and hydrophobic materials are envisioned, and the disclosure is not intended to be limited to the examples provided herein.

The pocket of water 90 is illustrated with dotted lines in FIG. 5. The pocket of water 90 will travel vertically along the hydrophilic portions 64 in contact with the pocket of water 90 and will additionally travel horizontally along the hydrophilic portion 62. In one embodiment, the carbon paper layer 60 may be described as being framed around a perimeter of the carbon paper layer 60 with two hydrophilic portions 62 running horizontally and two outermost hydrophilic portions 64 running vertically. The hydrophilic portions 62, 64 framing the carbon paper layer 60 or defining a frame portion 68 are configured for transporting water to the remaining interior hydrophilic portions 64 such that water 90 may be transported to a center portion 67 of the layer of carbon paper 60. The remaining interior hydrophilic portions 64 may be described as including an alternating vertical line pattern with the hydrophobic portions 65. Water that travels along the hydrophilic portion 62 will come into contact with and subsequently travel along the hydrophilic portions 64 not in contact with the portion pocket of water 90. The frame portion 68 and the center portion 67 of the carbon paper layer 60 [is] are illustrated. The hydrophilic portions 62, 64 and the hydrophobic portions 65 are configured for moving water from the frame portion 68 to the center portion 67 to facilitate rapid evaporation of the water 90 and prevent water 90 from accumulating or remaining near the frame portion 68. The particular pattern of hydrophilic portions 62, 64 and hydrophobic portions 65 is exemplary and may include other patterns, including but not limited to repeating, alternating horizontal or diagonal lines.

Referring to FIGS. 3 and 5, as a result of water 90 traveling along the hydrophilic portions 64 of the carbon paper layer 60, water 90 is channeled away from the perimeter 31 toward the center portion 67 of the carbon paper layer 60, where the water 90 may be dispersed through evaporation, water 90 may be absorbed by the membrane, and/or water 90 transferred through the headers 21 and 23 out of the fuel cell stack 110.

Figure 6:
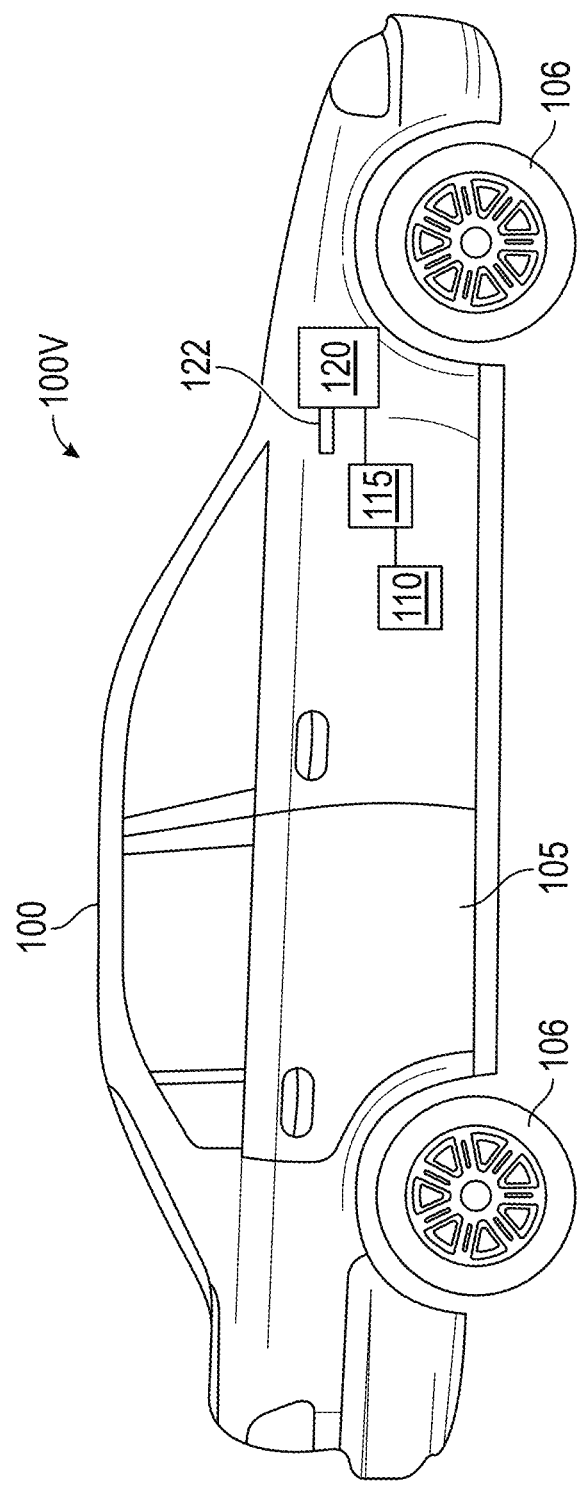
FIG. 6 schematically illustrates an exemplary device embodied as a vehicle including a fuel cell stack including at least one fuel cell including the fuel-cell membrane-subgasket assembly 1 of FIG. 1, in accordance with the present disclosure.

FIG. 6 schematically illustrates an exemplary device 100 embodied as a vehicle 100V including a vehicle body 105 connected to road wheels 106. The device 100 also has a fuel cell stack 110 including at least one fuel cell including the fuel-cell membrane-subgasket assembly 1 of FIG. 1. Device 100 may alternatively include stationary power generators, airplanes, ships, locomotives, or other similar devices. The fuel cell stack 110 utilizes an electrochemical reaction transforming a fuel, hydrogen gas, and oxygen from air into water 90, and the fuel cell stack 110 additionally provides electrical energy for use by the device 100. The device 100 may include an energy storage device 115 such as a battery. The energy storage device 115 provides electrical energy to an electric machine 120 which may utilize the electrical energy to provide an output torque to an output component 122 embodied as an output shaft, e.g., for powering the road wheels 106.

A system for fuel cell membrane edge protection in a device is provided. The system includes the device including a fuel cell. The fuel cell includes a fuel-cell membrane-subgasket assembly. The assembly includes an anode gas diffusion electrode and a cathode gas diffusion electrode configured for facilitating an electrochemical reaction with the anode gas diffusion electrode. The electrochemical reaction creates water as a by-product. The assembly further includes a proton exchange membrane disposed between the anode gas diffusion electrode and the cathode gas diffusion electrode and a subgasket. The subgasket includes an interior aperture portion defined by a perimeter. The subgasket is connected to the anode gas diffusion electrode and the proton exchange membrane about the perimeter such that an area of overlap between the subgasket, the anode gas diffusion electrode, and the proton exchange membrane exists around the perimeter. The assembly further includes a carbon paper layer spanning the interior aperture portion of the subgasket. The carbon paper layer includes patterned wettability and is configured to move the water away from the area of overlap into a center portion of the carbon paper layer.

The device may include a vehicle.

The carbon paper layer may include a pattern of hydrophilic portions and hydrophobic portions configured for providing the patterned wettability.

The carbon paper layer may have an outer perimeter. The pattern of hydrophilic portions and hydrophobic portions may include a frame portion around the outer perimeter including a first portion of the hydrophilic portions and a repeating pattern of alternating parallel lines interior to the frame portion. The alternating parallel lines may include a second portion of the hydrophilic portions and the hydrophobic portions.

The frame portion may be configured for transporting the water to the second portion of the hydrophilic portions interior to the frame portion.

The hydrophilic portions may include N-vinylformamide or acrylic acid.

The hydrophobic portions may include polytetrafluoroethylene (PTFE) or fluorinated ethylene propylene (FEP).

While the best modes for carrying out the disclosure have been described in detail, those familiar with the art to which this disclosure relates will recognize various alternative designs and embodiments for practicing the disclosure within the scope of the appended claims.

What is claimed is:

1. A system for fuel cell membrane edge protection, the system comprising:
   a fuel cell, including:
   a fuel-cell membrane-subgasket assembly, including:
   an anode gas diffusion electrode;
   a cathode gas diffusion electrode configured for facilitating an electrochemical reaction with the anode gas diffusion electrode, wherein the electrochemical reaction creates water as a by-product;
   a proton exchange membrane disposed between the anode gas diffusion electrode and the cathode gas diffusion electrode;
   a subgasket including an interior aperture portion defined by a perimeter, wherein the subgasket is connected to the anode gas diffusion electrode and the proton exchange membrane about the perimeter such that an area of overlap between the subgasket, the anode gas diffusion electrode, and the proton exchange membrane exists around the perimeter; and
   a carbon paper layer spanning the interior aperture portion of the subgasket, wherein the carbon paper layer has an outer perimeter and includes:
   a repeating pattern of parallel hydrophilic portions and hydrophobic portions configured to provide patterned wettability, and is the carbon paper layer being configured to move the water away from the area of overlap into a center portion of the carbon paper layer; and
   a frame portion surrounding the outer perimeter of the carbon paper layer, the frame portion including additional hydrophilic portions arranged orthogonally to the parallel hydrophilic portions and hydrophobic portions.

2. The system of claim 1, wherein the cathode gas diffusion electrode has a first planar side and a second planar side; and
   wherein the proton exchange membrane is attached to the first planar side and the carbon paper layer is attached to the second planar side.

3. The system of claim 2, wherein:
   the carbon paper layer includes a first layer of carbon paper; the fuel-cell membrane-subgasket assembly further including a second layer of carbon paper that also includes the patterned wettability.

4. The system of claim 1, wherein the anode gas diffusion electrode has a first planar side; and
   wherein the carbon paper layer is attached to the first planar side.

5. The system of claim 1, wherein the anode gas diffusion electrode has a first planar side and a second planar side; and
   wherein the proton exchange membrane is attached to the first planar side and the carbon paper layer is attached to the second planar side.

6. The system of claim 1, wherein the hydrophilic portions include N-vinylformamide.

7. The system of claim 1, wherein the hydrophobic portions include polytetrafluoroethylene (PTFE).

8. The system of claim 1, wherein the hydrophobic portions are configured for resisting a flow of the water into the hydrophobic portions and providing for evaporation of the water from the parallel hydrophilic portions and the additional hydrophobic portions.

9. The system of claim 1, wherein the fuel-cell membrane-subgasket assembly further includes:
a first header configured for channeling hydrogen into the fuel-cell membrane-subgasket assembly;
a second header configured for transporting an excess of hydrogen out of the fuel-cell membrane-subgasket assembly;
a third header configured for transmitting an oxidant into the fuel-cell membrane-subgasket assembly;
a fourth header configured for transporting an excess of the oxidant out of the fuel-cell membrane-subgasket assembly;
a fifth header configured for bringing a coolant into the fuel-cell membrane-subgasket assembly; and
a sixth header configured for transporting the coolant out of the fuel-cell membrane-subgasket assembly; and
wherein the water upon the center portion is transported out of the fuel-cell membrane-subgasket assembly through the second header.

10. A system for fuel cell membrane edge protection in a device, the system comprising:
the device including a fuel cell, the fuel cell including:
a fuel-cell membrane-subgasket assembly, including:
an anode gas diffusion electrode;
a cathode gas diffusion electrode configured for facilitating an electrochemical reaction with the anode gas diffusion electrode, wherein the electrochemical reaction creates water as a by-product;
a proton exchange membrane disposed between the anode gas diffusion electrode and the cathode gas diffusion electrode;
a subgasket including an interior aperture portion defined by a perimeter, wherein the subgasket is connected to the anode gas diffusion electrode and the proton exchange membrane about the perimeter such that an area of overlap between the subgasket, the anode gas diffusion electrode, and the proton exchange membrane exists around the perimeter; and
a carbon paper layer spanning the interior aperture portion of the subgasket, wherein the carbon paper layer includes patterned wettability and is configured to move the water away from the area of overlap into a center portion of the carbon paper layer, wherein the carbon paper layer includes an outer perimeter and a pattern of hydrophilic portions and hydrophobic portions configured for providing the patterned wettability, and wherein:
the pattern of hydrophilic portions and hydrophobic portions includes:
a frame portion around the outer perimeter including a first portion of the hydrophilic portions, and forms a repeating pattern of alternating parallel lines interior to the frame portion, the alternating parallel lines including a second portion of the hydrophilic portions and the hydrophobic portions.

11. The system of claim 10, wherein the frame portion is configured for transporting the water to the second portion of the hydrophilic portions interior to the frame portion.

12. The system of claim 10, wherein the hydrophilic portions include N-vinylformamide.

13. The system of claim 10, wherein the hydrophobic portions include polytetrafluoroethylene (PTFE).

14. The system of claim 1, wherein the hydrophilic portions include acrylic acid.

15. The system of claim 1, wherein the hydrophobic portions include fluorinated ethylene propylene (FEP).

16. The system of claim 10, wherein the fuel-cell membrane-subgasket assembly further includes:
a first header configured for channeling hydrogen into the fuel-cell membrane-subgasket assembly;
a second header configured for transporting an excess of hydrogen out of the fuel-cell membrane-subgasket assembly;
a third header configured for transmitting an oxidant into the fuel-cell membrane-subgasket assembly;
a fourth header configured for transporting an excess of the oxidant out of the fuel-cell membrane-subgasket assembly;
a fifth header configured for bringing a coolant into the fuel-cell membrane-subgasket assembly; and
a sixth header configured for transporting the coolant out of the fuel-cell membrane-subgasket assembly; and
wherein the water upon the center portion is transported out of the fuel-cell membrane-subgasket assembly through the fourth header.

17. The system of claim 10, wherein the hydrophilic portions include.

18. The system of claim 10, wherein the hydrophobic portions include fluorinated ethylene propylene (FEP).

19. A vehicle comprising:
a vehicle body;
road wheels connected to the vehicle body;
an electric machine configured to power the road wheels via an output component; and
a fuel cell stack configured to provide electrical energy to the electric machine, the fuel cell stack comprising a plurality of fuel cells each including a fuel-cell membrane-subgasket assembly, the fuel-cell membrane-subgasket assembly comprising:
an anode gas diffusion electrode;
a cathode gas diffusion electrode configured for facilitating an electrochemical reaction with the anode gas diffusion electrode, wherein the electrochemical reaction creates water as a by-product;
a proton exchange membrane disposed between the anode gas diffusion electrode and the cathode gas diffusion electrode;
a subgasket including an interior aperture portion defined by a perimeter, wherein the subgasket is connected to the anode gas diffusion electrode and the proton exchange membrane about the perimeter such that an area of overlap between the subgasket, the anode gas diffusion electrode, and the proton exchange membrane exists around the perimeter; and
a carbon paper layer spanning the interior aperture portion of the subgasket, wherein the carbon paper layer includes patterned wettability and is configured to move the water away from the area of overlap into a center portion of the carbon paper layer, wherein the carbon paper layer includes an outer perimeter and a pattern of hydrophilic portions and hydrophobic portions configured for providing the patterned wettability, and wherein:
the pattern of hydrophilic portions and hydrophobic portions includes:

a frame portion around the outer perimeter including a first portion of the hydrophilic portions, and forms a repeating pattern of alternating parallel lines interior to the frame portion, the alternating parallel lines including a second portion of the hydrophilic portions and the hydrophobic portions.

20. The vehicle of claim 19, wherein the cathode gas diffusion electrode has a first planar side and a second planar side, and wherein the proton exchange membrane is attached to the first planar side and the carbon paper layer is attached to the second planar side.

\* \* \* \* \*